Oct. 25, 1932.  P. M. SCHIBROWSKI  1,884,281
BABY CARRIAGE FIFTH WHEEL ASSEMBLY
Filed March 3, 1930   2 Sheets-Sheet 2

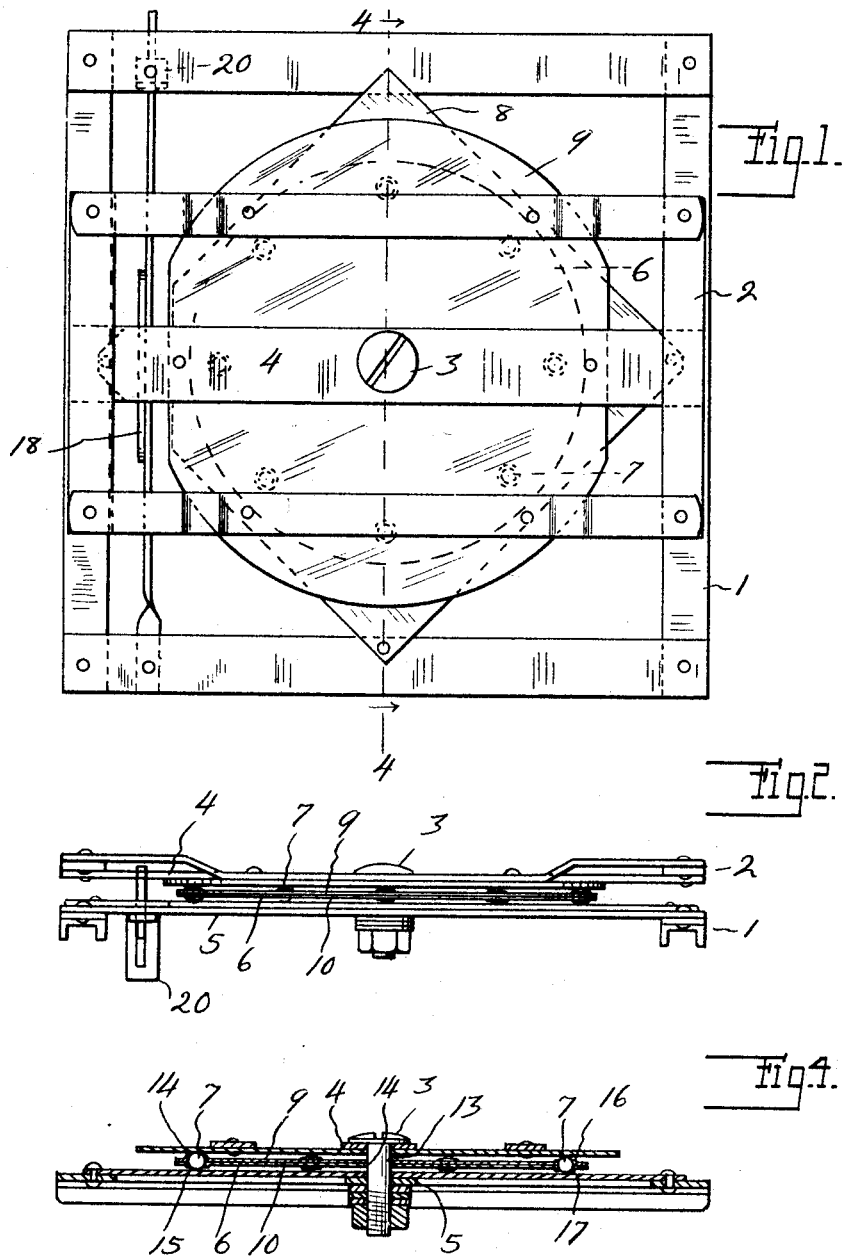

INVENTOR
Paul M. Schibrowski
BY
Whittemore, Hulbert, Whittemore & Belknap
ATTORNEYS

Patented Oct. 25, 1932

1,884,281

UNITED STATES PATENT OFFICE

PAUL M. SCHIBROWSKI, OF TOLEDO, OHIO, ASSIGNOR, BY MESNE ASSIGNMENTS, TO THE AMERICAN-NATIONAL COMPANY, OF TOLEDO, OHIO, A CORPORATION OF OHIO

BABY CARRIAGE FIFTH WHEEL ASSEMBLY

Application filed March 3, 1930. Serial No. 432,869.

This invention relates generally to fifth wheel assemblies for juvenile vehicles and refers more particularly to a fifth wheel mounting for a reversible cab of a baby carriage.

One of the essential objects of the invention is to provide the cab with a ball bearing mounting that will enable it to be easily and quickly reversed end for end.

Another object is to provide a ball bearing mounting in which ball bearings are arranged in such a way between relatively wide races that the cab is properly supported and cannot tilt relative to the king pin in any position of rotation.

Another object is to provide a mounting of this type in which the cab and chassis frames are close together and are held in assembled relation by a relatively short king pin.

Another object is to provide a ball bearing mounting in which one of the races for the ball bearings is secured to and serves as a brace for three of the chassis frame members or sides.

Another object is to provide a strong and durable structure that is simple in construction and can be manufactured at a comparatively low cost.

With the above and other objects in view the invention consists of certain novel features of construction, combinations and arrangements of parts that will be hereinafter more fully described and particularly pointed out in the appended claims.

In the accompanying drawings:

Figure 1 is a top plan view of a fifth wheel assembly embodying my invention;

Figure 2 is an edge elevation of the construction illustrated in Figure 1;

Figure 4 is a sectional view taken on the line 4—4 of Figure 1;

Figure 3:
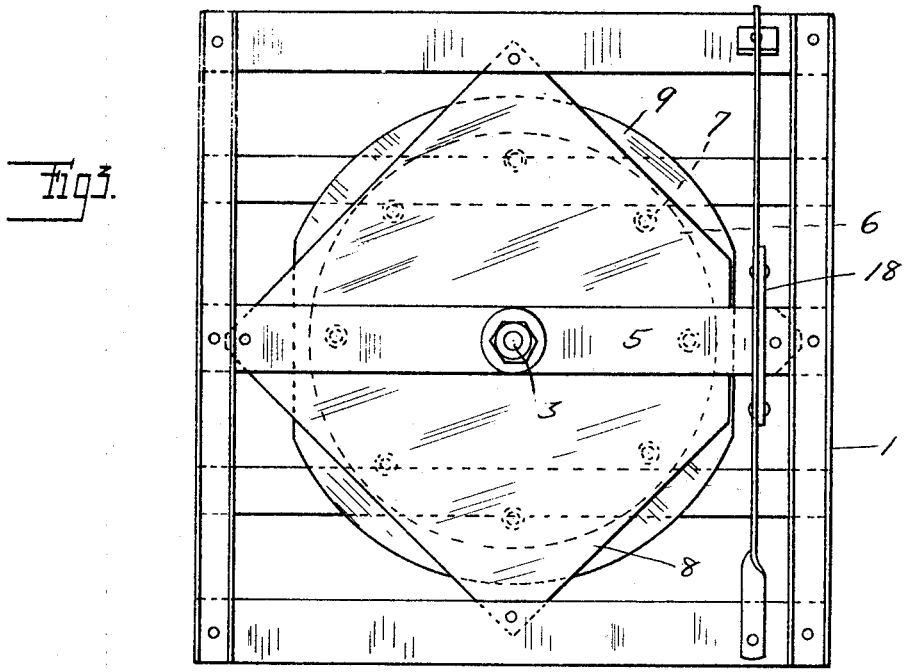
Figure 3 is a bottom plan view of the construction illustrated in Figure 1.
Figure 5:
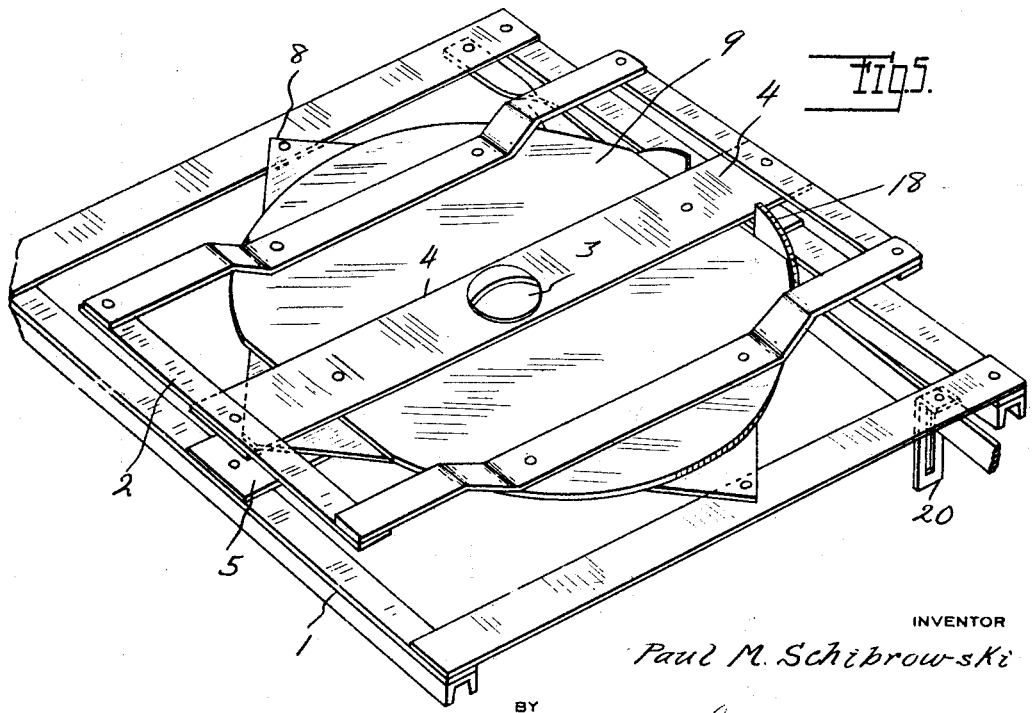
Figure 5 is a perspective view of the assembly.

Referring now to the drawings, 1 is a chassis frame; 2 is a reversible cab frame; 3 is a king pin or bolt extending through aligned openings in intermediate cross bars 4 and 5 respectively of said frames; 6 is a substanially flat and wide ball bearing cage on the pin between the frames 1 and 2; 7 are ball bearings arranged in a circle within and projecting through opposite sides of the cage; and 8 and 9 respectively are metal plates riveted to the opposed faces of the frames 1 and 2 above and below the cage 6 and constituting races for the ball bearings 7. As shown, the races 8 and 9 are very wide, in fact the area of each race is greater than one half the area of the chassis frame 1. Preferably the race 8 comprises a substantially square plate having three corners thereof secured to three sides of the frame 1, while the race 9 comprises a circular disk and is secured at several points to the frame 2. The cage 6 has a diameter substantially equal to the race 9 and comprises two plates 10 and 11 respectively of circular formation having registering openings 12 and 13 therein at the center, receiving the king pin 3 and having registering openings 14 and 15 therein at the outer edges thereof receiving the ball bearings 7. Hence the ball bearings 7 in the openings 14 and 15 at the outer edges of the cage engage the races 8 and 9 adjacent their outer edges and provide a relatively broad bearing for the race 9 and prevent the cab frame from tilting relative to the king pin. Preferably the plates 10 and 11 are spot welded together adjacent the registering openings 12 and 13 and have frustro-conical portions 16 and 17 respectively projecting outwardly from the edges of the openings 14 and 15 around the ball bearings. Thus the frustroconical portions just mentioned constitute thrust bearings for the ball bearings. Any suitable means such as the latch 18 secured to the chassis frame and having the U plate 20 intermediate its ends embracing the cross bars 4 and 5 of the frames may be employed to hold the cab frame in adjusted position relative to the chassis frame.

Thus from the foregoing description it will be apparent that I have provided a strong and durable cab mounting that enables the cab to be easily and quickly reversed end for end.

Inasmuch as the area of the uppermost race 9 is greater than one half the area of the chassis frame, and the diameter of the cage is substantially equal to the diameter of the uppermost race, the balls in the cage at the periphery thereof engage the races adjacent their outer edges and provide about the king pin a wide bearing that insures a proper support for the cab in all positions of rotation, prevents the cab from tilting relative to the king pin, and enables the cab and chassis frames to be held close together by a relatively short king pin. Thus intermediate frames such as 36 set forth in Brown 1,611,409 and king pin braces have been dispensed with entirely.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In combination, a baby carriage chassis frame, a king pin carried by said frame, a reversible baby carriage cab frame mounted on the king pin so that either end thereof may be swung about the king pin to the rear of the chassis frame, and means for facilitating the swinging of the cab frame including a ball bearing cage on the king pin between said frames, ball bearings carried by the cage, and races for the ball bearings mounted on the king pin and connected to the opposed sides of the frames.

2. A baby carriage fifth wheel assembly including a king pin, upper and lower frames having central cross bars mounted on the king pin, a ball bearing cage on the king pin between said frames and having an area substantially equal to one of the frames, ball bearings carried by the cage adjacent the outer edges thereof, and means supplemental to the cross bars for connecting the frames to the king pin including means bridging the cross bars and having portions constituting races for the ball bearings in the cage.

3. A baby carriage fifth wheel assembly including a king pin, upper and lower frames having central cross bars mounted on the king pin, a ball bearing cage on the king pin between said frames and having an area substantially equal to one of the frames, ball bearings carried by the cage adjacent the outer edges thereof, and means extending between the king pin and frames above and below the cage and having portions constituting races for the ball bearings in the cage.

4. A baby carriage fifth wheel assembly including a king pin, upper and lower frames having central cross bars mounted on the king pin, a ball bearing cage on the king pin between said frames and having an area substantially equal to one of the frames, ball bearings carried by the cage adjacent the outer edges thereof, and plates rigid with the opposed sides of said frames above and below the cage, mounted on the king pin and having flat portions adjacent their outer edges constituting races for the ball bearings in the cage.

5. A baby carriage fifth wheel assembly including a chassis frame having a central cross bar, a king pin extending through said cross bar, a cab frame above the chassis frame and having a central cross bar mounted on the king pin whereby a cab carried by said frame may be reversed so either end thereof may be brought to the rear end of the chassis frame, a ball bearing cage on the king pin between and extending beyond opposite side edges of the cross bars aforesaid, ball bearings carried by the cage and projecting above and below the same, and opposed plates rigid with the bars on the king pin and having flat portions of greater area than the cage disposed above and below the same and constituting races for the ball bearings therein.

6. In combination, a baby carriage chassis frame, a smaller reversible baby carriage cab frame above the chassis frame, a king pin extending through portions of said frames, a ball bearing cage on the king pin between said frames and having a diameter substantially equal to the width of the cab frame, ball bearings carried by said cage at the outer edges thereof, and plates of greater area than the cage mounted on the king pin, secured to the opposed faces of said frames and provided adjacent the points of connection with said frames with portions that engage and constitute races for the ball bearings in said cage.

7. In a baby carriage, a chassis frame having a pair of laterally spaced members, a plate bridging the space between said members at a point substantially midway of their ends and constituting a ball bearing race, a ball bearing cage on the plate at approximately the center thereof, ball bearings carried by the cage and resting on the race aforesaid, a body above the cage, and a connection between the body and chassis permitting the body to be reversed end for end on the ball bearings aforesaid including a frame rigid with the body, and a king pin extending through a portion of the last mentioned frame and through the cage and plate aforesaid.

8. In a baby carriage, a chassis frame having a pair of laterally spaced members, a plate bridging the space between said members at a point substantially midway of their ends and constituting a ball bearing race, a ball bearing cage on the plate at approximately the center thereof, ball bearings carried by the cage and resting on the race aforesaid, a body above the cage, and a connection between the body and chassis permitting the body to be reversed end for end on the ball bearings aforesaid including a frame rigid with the body, a plate rigid with the frame and having a portion resting on the ball bearings in the cage, and a king pin extending through said last mentioned plate and through the cage and first mentioned plate.

In testimony whereof I affix my signature.
PAUL M. SCHIBROWSKI.